March 31, 1964 W. SMEULERS 3,127,570

CIRCUIT ARRANGEMENT FOR SYNCHRONIZING A LOCAL OSCILLATOR WITH THE AID OF A PHASE DISCRIMINATOR

Filed Oct. 18, 1960 4 Sheets-Sheet 1

INVENTOR
WOUTER SMEULERS
BY Frank R. Jufari
AGENT

March 31, 1964 W. SMEULERS 3,127,570

CIRCUIT ARRANGEMENT FOR SYNCHRONIZING A LOCAL OSCILLATOR WITH THE AID OF A PHASE DISCRIMINATOR

Filed Oct. 18, 1960 4 Sheets-Sheet 2

INVENTOR
WOUTER SMEULERS
BY Frank R. Trifari
AGENT

March 31, 1964 W. SMEULERS 3,127,570

CIRCUIT ARRANGEMENT FOR SYNCHRONIZING A LOCAL OSCILLATOR WITH THE AID OF A PHASE DISCRIMINATOR

Filed Oct. 18, 1960 4 Sheets-Sheet 3

INVENTOR
WOUTER SMEULERS
BY Frank R. Trifari
AGENT

March 31, 1964 W. SMEULERS 3,127,570

CIRCUIT ARRANGEMENT FOR SYNCHRONIZING A LOCAL OSCILLATOR WITH THE AID OF A PHASE DISCRIMINATOR

Filed Oct. 18, 1960 4 Sheets-Sheet 4

INVENTOR
WOUTER SMEULERS
BY Frank R. Trifari
AGENT

United States Patent Office 3,127,570

Patented Mar. 31, 1964

3,127,570

CIRCUIT ARRANGEMENT FOR SYNCHRONIZING A LOCAL OSCILLATOR WITH THE AID OF A PHASE DISCRIMINATOR

Wouter Smeulers, Eindhoven, Netherlands, assignor to North American Philips Company, Inc., New York, N.Y., a corporation of Delaware Filed Oct. 18, 1960, Ser. No. 63,431
Claims priority, application Netherlands Nov. 18, 1959
8 Claims. (Cl. 331—20)

The invention relates to a circuit arrangement for synchronizing a local oscillator with the aid of a phase discriminator to which are supplied a pulsatory synchronizing signal and a saw-tooth reference signal taken from the local oscillator and the output terminal of which is connected to the oscillator to be synchronized.

Such circuit arrangements are known and are frequently used in television receivers for synchronizing the local oscillator generating the control signal for the line output tube.

As is known, such circuit arrangements have a so-called hold range and a so-called lock-in range. The size of the lock-in range is determined by a low-pass filter associated with the phase discriminator. The better this filter attenuates the higher frequencies, the less sensitive to interference becomes the circuit arrangement, however, the lock-in range is reduced proportionally. This gives rise to the difficulty that, when synchronization is lost in some manner, for example by switching in the receiver or by changing it over from one transmitter to another, the resulting out-of-synchronism condition can only be converted automatically into an in-synchronism condition if the frequency deviation between the synchronizing signal and the oscillator signal lies within the said lock-in range.

Especially in modern television receivers which must have minimum sensitivity to interference and which furthermore must satisfy the requirement that synchronism can automatically be restored under any circumstances, mere use of a phase discriminator is insufficient.

Therefore it has already been proposed in U.S. patent specification 2,551,785 to add to the phase discriminator proper a circuit arrangement differentiating and then rectifying the beat signal taken from the phase discriminator in the out-of-synchronism condition so that a direct voltage of the desired polarity is produced. This direct voltage is supplied to the local oscillator so that the latter is adjusted and brought to a frequency situated within the lock-in range of the phase discriminator itself.

The circuit arrangement according to the present invention also uses a beat signal produced during out-of-synchronism conditions, but this beat signal is utilized in a completely different manner so that a simple and more efficient circuit arrangement is obtained.

For this purpose, the circuit arrangement in accordance with the invention is characterized in that either the synchronizing signal or the saw-tooth signal is supplied to the phase discriminator through a gate circuit, the pulsatory synchronizing signal and a second pulse signal correlated with the saw-tooth signal being added in an addition circuit and the resulting sum voltage being applied after integration and, as the case may be, phase reversal to the gate circuit which is adjusted so that in an in-synchronism condition by the action of the integrated sum voltage it is continuously opened, and in an out-of-synchronism condition, owing to the beat signal then produced from the sum voltage by integration, it is opened substantially during the first half cycle of this signal and closed during the second half cycle.

Some embodiments of circuit arrangements in accordance with the invention will now be described, by way of example, with reference to the accompanying drawings in which.

Figure 3:
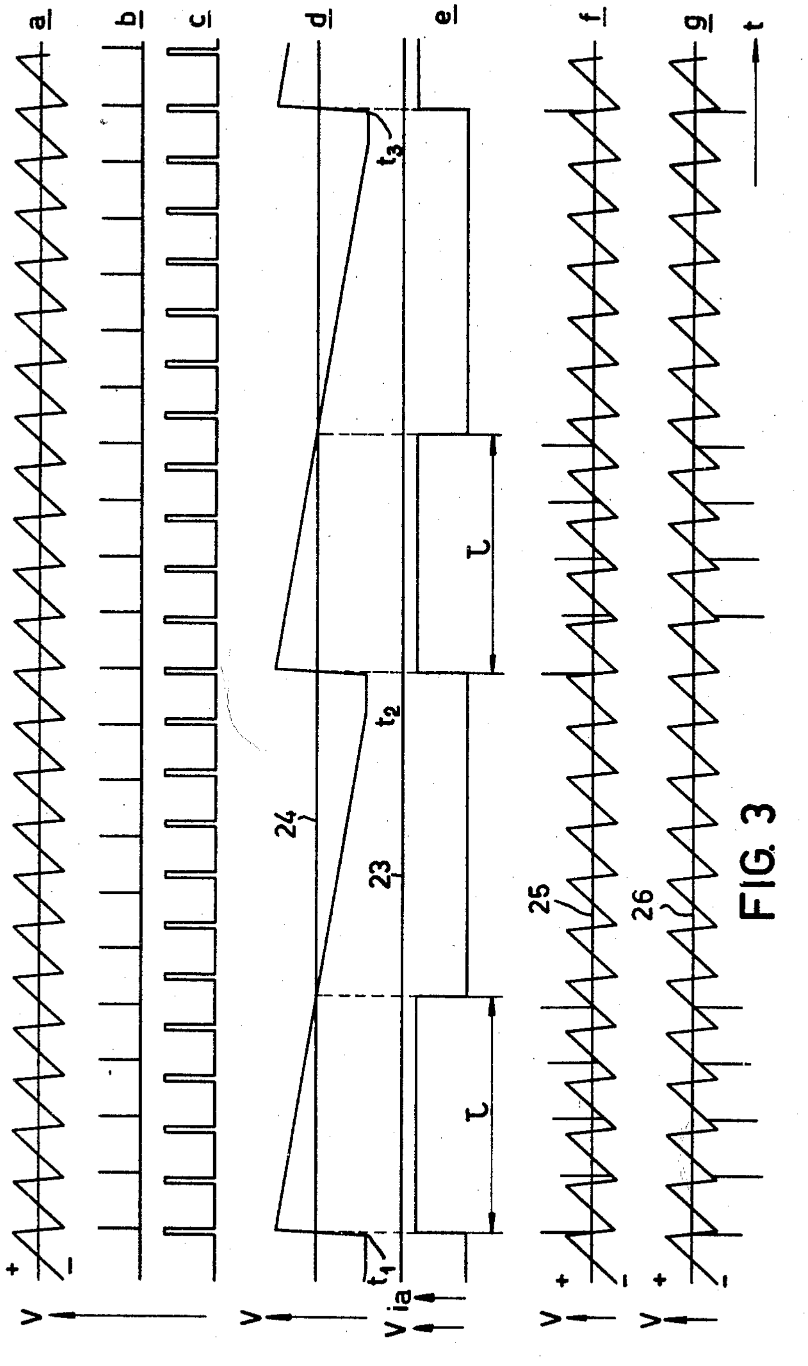
Figure 4:
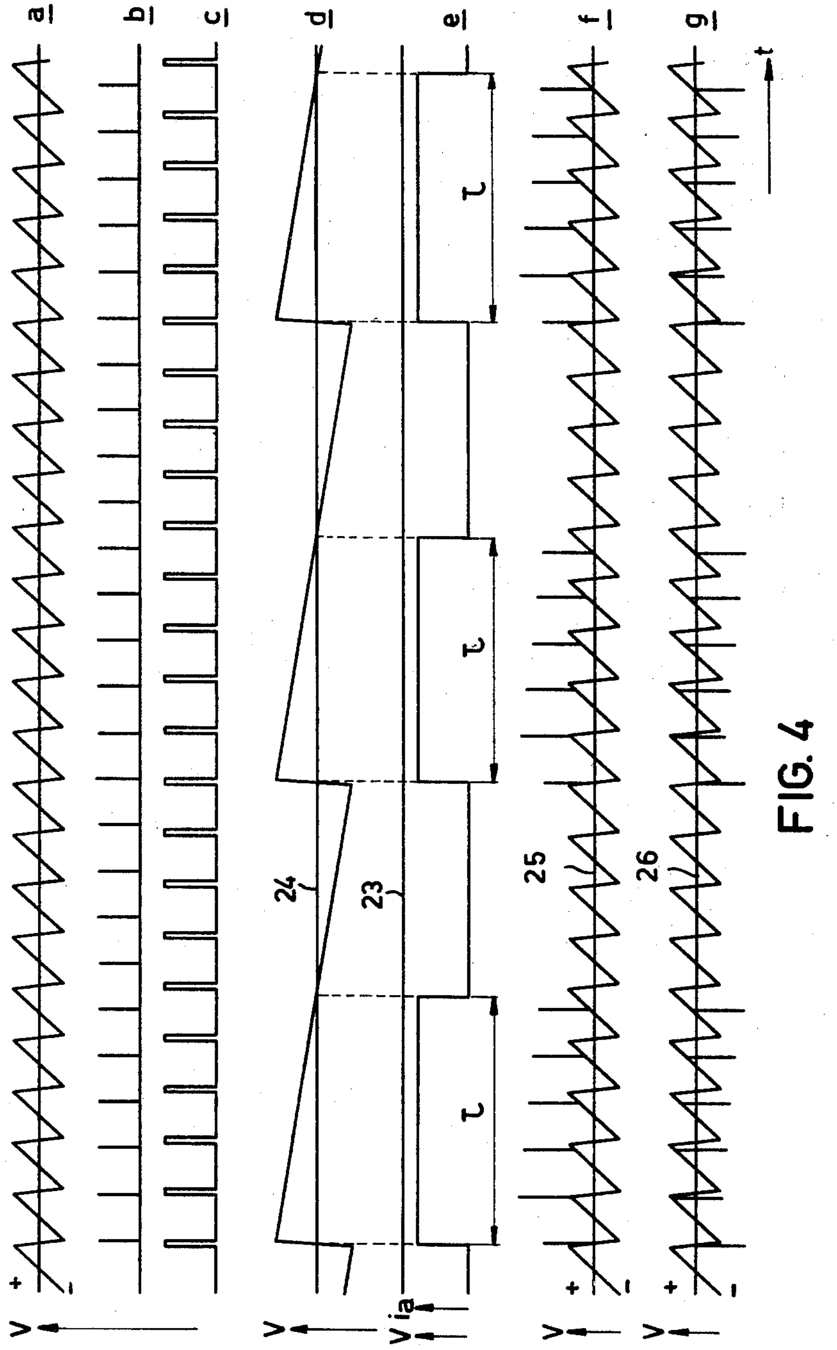

FIGS. 3 and 4 serve for illustration.

Figure 5:
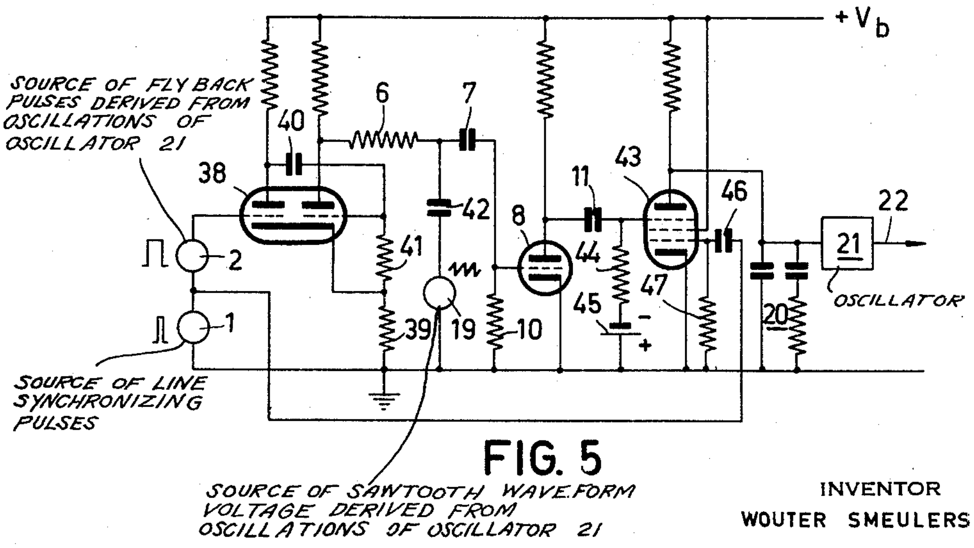
Figure 6:
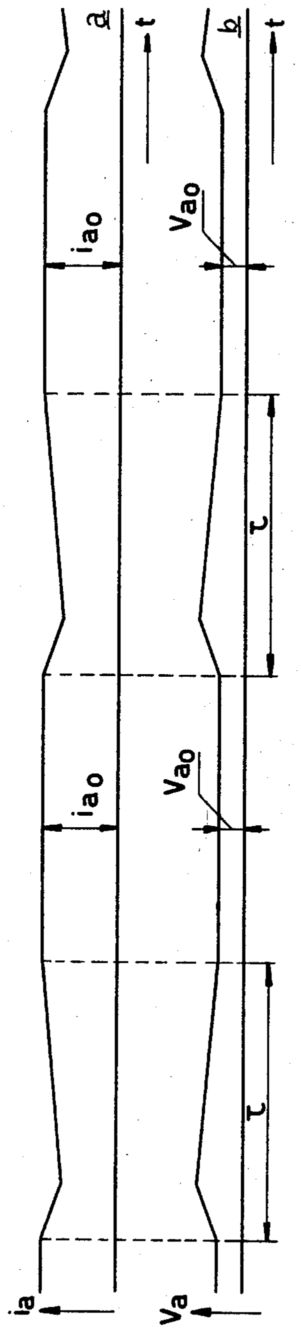
Figure 7:
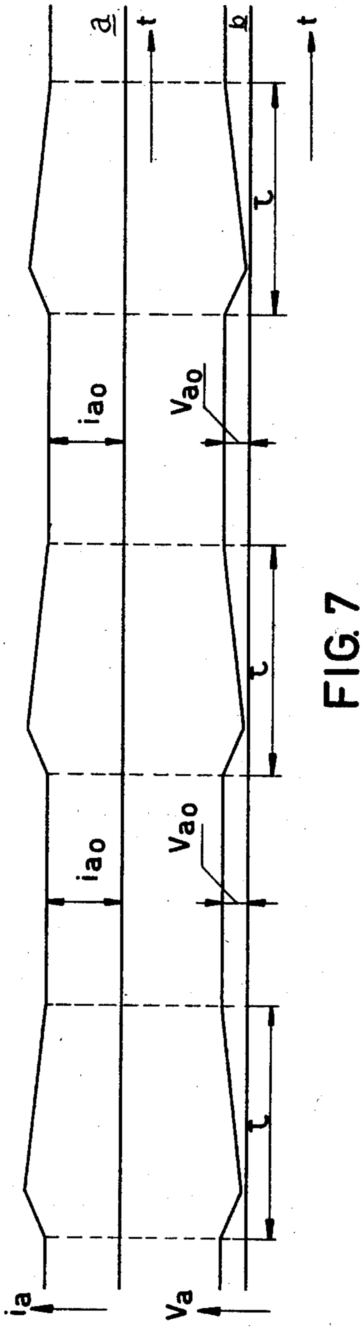

FIG. 5 shows an embodiment in which instead of a symmetrical phase detector an asymmetrical one is used, and FIGS. 6 and 7 serve to illustrate the circuit arrangement of FIG. 5.

Figure 1:
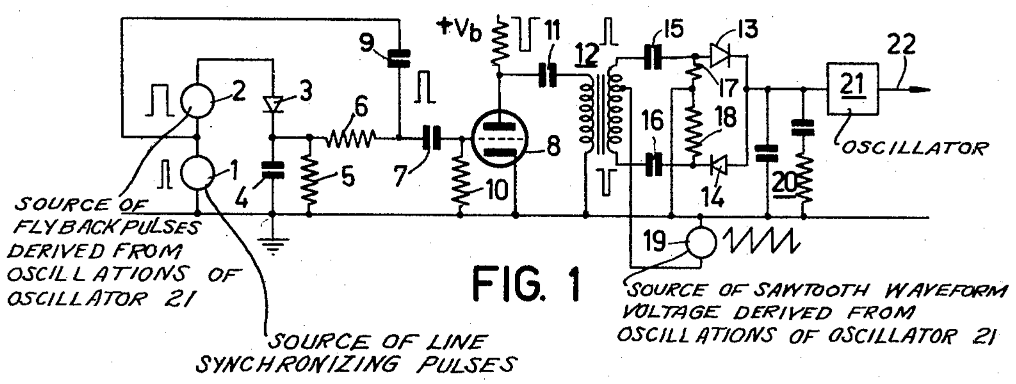
FIG. 1 shows a first embodiment.

In FIG. 1, reference numeral 1 denotes a voltage source producing the line-synchronizing pulses separated from the incoming television signal.

A voltage source 2 produces the fly-back pulses derived from the saw-tooth current flowing through the line deflection coils.

As is known, the duration of the fly-back pulses slightly exceeds that of the line-synchronizing pulses.

In the in-synchronism condition, the synchronizing pulses and the fly-back pulses always coincides. Since the sources 1 and 2 are connected in series, the two pulses are added together and produce a current passing through a diode 3 by which a capacitor 4 is charged. This capacitor can discharge through a resistor 5, however, since the time constant of the network 4, 5 is large relative to the period of the line-synchronizing pulses, the capacitor 4 can hardly discharge in the said in-synchronism condition. Hence, the cathode of the diode 3 is at a substantially constant positive voltage with respect to earth. The cathode of this diode 3 is connected to the control grid of a gate tube 8 through a separating resistor 6 and a coupling capacitor 7. Since the capacitor 7 does not pass the direct voltage, the control grid of the tube 8 is substantially at earth potential in an in-synchronism condition.

The line synchronizing pulses from the source 1 also are supplied to the control grid of the tube 8 through a capacitor 9 and a grid-leak resistor 10. By grid-current detection, the peaks of the synchronizing signals are brought to earth potential and the tube 8 operates as a normal synchronizing amplifier. The amplified synchronizing pulses are applied through a capacitor 11 to the primary of a transformer 12 to the secondary of which a known phase discriminator is connected. This discriminator is designed symmetrically and comprises diodes 13 and 14 and associated capacitors 15 and 16 and resistors 17 and 18.

A saw-tooth voltage produced by a source 19 is supplied to this phase discriminator through the centre tap on the secondary of the transformer 12. By means of this phase discriminator and the two voltages applied thereto a control voltage can be set up at the junction point of the two diodes 13 and 14 in the in-synchronism condition. This control voltage is smoothed by a filter 20 associated with the phase discriminator and then applied to an oscillator circuit 21.

This symmetrical phase discriminator is capable of delivering both a positive and a negative control voltage by which the oscillator 21 is adjusted so that the repetition frequency of the signal produced by this oscillator becomes equal to the repetition frequency of the synchronizing signal and there only remains a phase difference between the two signals such as to enable the required control voltage to be produced.

It should be noted that in the symmetrical phase discriminator shown in FIG. 1 the synchronizing pulses are supplied to the two diodes in phase opposition while the saw-tooth signal is supplied thereto in phase. Obviously, in the circuit arrangement of FIG. 1 use may alternatively be made of a symmetrical phase detector, the synchronizing pulses being supplied to the two diodes in phase and the saw-tooth signal with opposite phase.

The oscillator circuit 21 may be a relaxation oscillator which directly generates a saw-tooth voltage. In this event, the source 19 may be omitted and the centre tap on the secondary of the transformer 12 is directly connected to the output terminal 22 of the oscillator 21. The fly-back pulses produced by the source 2 can be obtained in a simple manner by differentiation of the saw-tooth voltage.

The oscillator circuit 21 may alternatively be a sine oscillator with an associated reactance tube to which the control voltage is applied. In this event, the sine voltage must be converted into a saw-tooth voltage with the aid of limiter circuits and integrating networks.

In the embodiment described in which the voltage taken from the oscillator 21 is used for controlling the line output tube in a television receiver, the required voltages may be obtained in known manner. The anode circuit of this line output tube includes an output transformer and by the provision of additional windings on this transformer, both the fly-back pulses and, by subsequent integration, the saw-tooth voltages may be obtained. The serially connected sources 1 and 2 may simply be obtained by connecting one of the additional windings provided on the line output transformer in series with the secondary of a transformer to the primary of which the synchronizing pulses are supplied.

As is known, a phase discriminator has a limitation in that its lock-in range is considerably smaller than its hold range. Hence, if for any reason, for example by switching on the receiver or by changing over from one transmitter to another, synchronism is lost, as a rule this lock-in range is too small to restore synchronism automatically.

In contradistinction thereto, the circuit arrangement in accordance with the invention enables synchronism to be restored automatically even when the frequency deviation between the synchronizing and oscillator signals lies far beyond the lock-in range but within the hold range of the phase discriminator.

The operation of the circuit arrangement in an out-of-synchronism condition will be described with reference to FIG. 3 if the frequency $f_o$ of the oscillator signal is greater than the frequency $f_s$ of the synchronizing signal, and with reference to FIG. 4 if $f_o<f_s$.

For this purpose, FIG. 3*a* shows the saw-tooth signal produced by the source 19, FIG. 3*b* the line synchronizing signal from the source 1 and FIG. 3*c* the fly-back pulses from the source 2.

It should be noted that, as will be seen from a comparison of FIGS. 3*a* and 3*c*, the fly-back pulses coincide with the steep edges of the saw-tooth voltage.

As will be seen from a comparison of FIGS. 3*b* and 3*c*, the synchronizing pulses and the fly-back pulses only coincide each time after a certain number of cycles. In FIG. 3 they coincide at instants $t_1$, $t_2$ and $t_3$. At these instants the capacitor 4 is charged to approximately the peak value of the sum of the two pulses. The capacitor 4 then discharges through the resistor 5 and since several cycles must be performed before a synchronizing pulse and a fly-back pulse will again coincide, discharging can continue until the voltage across the capacitor 4 is equal to the peak value of the pulses having the larger amplitude. If it is assumed that the fly-back pulses have the larger amplitude, the diode 3 will commence to pass current when the voltage across the capacitor 4 has become substantially equal to the amplitude of the fly-back pulses.

The voltage across the capacitor 4 is shown as a function of time in FIG. 3*d*. Immediately before the instants $t_1$, $t_2$ and $t_3$ the curve shows level portions produced by the above-described phenomenon. In FIG. 3*d* a line 23 represents earth potential.

The shape of the curve shown in FIG. 3*d* is highly dependent upon the frequency deviations between the synchronizing pulses and the fly-back pulses. If it is assumed that the frequency deviation becomes smaller than is shown in FIG. 3, the frequency of the beat signal shown in FIG. 3*d* will be lower. The intervals between the instants $t_1$, $t_2$ and $t_3$ will be larger and hence the level part at the base of the substantially saw-tooth-shaped beat signal will also be larger.

If, however, the frequency deviation increases, the intervals between the instants $t_1$, $t_2$ and $t_3$ will be smaller so that the level portions will be reduced and finally will entirely disappear. Hence, the amplitude of the beat signal shown in FIG. 3*d* decreases with increase in the frequency deviation. As will be explained more fully hereinafter, the shape of this saw-tooth beat signal is of importance for the extent of the lock-in range of the circuit arrangement in accordance with the invention. Assuming the maximum frequency deviation comprised in the lock-in range of the phase discriminator to be 25 c./s., the time constant of the network 4, 5 must be such that at this frequency deviation a fairly sawtoothed-shaped beat signal is produced, that is to say, the level portion should not be too large.

However, if the circuit arrangement should be capable of locking-in a frequency deviation of 1000 c./s., the time constant of the network 4, 5 must be such that even at the beat frequency of 1000 c./s. the capacitor 4 is enabled to discharge to a reasonably low value, in other words, that the sawtooth beat signal still has a sufficiently large amplitude.

Hence, in a preferred embodiment of the circuit arrangement in accordance with the invention, the time constant of the network 4, 5 is made about 10 milliseconds when the television for which the synchronization circuit is developed, is designed for a 625 line per picture and 25 pictures per second system.

The sawtooth voltage taken from the network 4, 5 is applied to the control grid of the gate tube 8 through the resistor 6 and the capacitor 7. By grid current detection, the peaks of the saw-tooth signal are slightly flattened so that this signal is situated in the grid base of the tube 8 so as to prevent anode current from flowing when the current at the control grid falls below the level indicated by the line 24.

Consequently, neglecting the synchronizing pulses also applied to this control grid, the anode current is shaped in the form shown in FIG. 3*e*. In other words, this tube is continually opened for a time $\tau$ and closed for the remainder of a period of the beat signal. Thus, the synchronizing pulses are passed by the gate tube 8 for a time $\tau$ only. Since the sawtooth voltage supplied by the source 19 is normally applied to the centre tap of the secondary of the transformer 12, a signal as shown in FIG. 3*f* is applied to the diode 13 and a signal as shown in FIG. 3*g* to the diode 14.

These latter figures, in which the lines 25 and 26 represent earth potential, show that the peaks of the synchronizing pulses of the signals applied to the diode 13 during the times $\tau$ on an average will extend less far in the positive direction than the peaks of the signals applied to the diode 14 extend in the negative direction. Hence, during these times $\tau$ the phase discriminator on an average produces a negative voltage. Outside of the time $\tau$ the mean output voltage is zero volts so that the total output voltage of the phase discriminator will be negative in a situation in which $f_o>f_s$. By means of this negative voltage, which is smoothed by the filter 20, the oscillator 21 can be adjusted to an extent such that the oscillator frequency is comprised within the lock-in range of the phase discriminator itself, permitting normal locking-in.

FIG. 4 applies to an out-of-synchronism condition in which $f_o<f_s$. Here again a sawtooth beat signal is produced of a shape shown in FIG. 4*d* and is applied to the control grid of the gate tube 8. In FIG. 4, the frequency deviation between synchronizing and fly-back pulses is made greater than in the case of FIG. 3. Hence, the amplitude of the beat signal shown in FIG. 4*d* is smaller than that shown in FIG. 3*d* since the capacitor 4 now cannot discharge to a value such that the diode 3 is made conductive again by either of the two pulse trains. From FIGS. 4*f* and 4*g* it follows that at this frequency deviation the peaks of the synchronizing pulses of the signals applied to the diode 13 during the period of time $\tau$ on an average will extend further in the positive direction than the peaks of the signals applied to the diode 14 extend in the negative direction. Since outside the times $\tau$ the mean output of the phase discriminator is again zero volts, the mean total output voltage of the phase discriminator is positive in a situation in which $f_o<f_s$. By means of this positive voltage the oscillator frequency can be adusted until it lies within the lock-in range of the phase discriminator itself.

Thus, the in-synchronism condition can always be restored in this manner. Then the synchronizing pulses and the fly-back pulses coincide and hence the synchronizing pulses and the steep edges of the sawtooth voltage as shown in FIGS. 3*a* and 4*a* also coicide. If the frequency of the synchronizing signal is equal to the natural frequency of the oscillator, the phase discriminator need not deliver any voltage in the in-synchronism condition and the synchronizing pulses are situated at the middle of the steep edges. If the frequency of the synchronizing signal becomes lower than the natural frequency of the oscillator, in the system described a negative voltage must be delivered by the phase discriminator. Hence, the synchronizing pulses shift to the right on the steep edges so that the diode 14 can deliver a larger voltage than the diode 13. In theory this shifting may be continued until both the positive-going and the negative-going synchronizing pulses are situated on the maximum negative value of the sawtooth voltage.

Similarly the synchronizing pulses will shift to the left on the steep edges when the frequency of the synchronizing signal becomes higher than the natural frequency of the oscillator. Hence, the diode 13 can deliver a greater voltage so that the control voltage becomes positive. In this case also, both the positive-going and the negative-going synchronizing pulses may shift until the maximum positive value of the sawtooth voltage is reached.

In both extreme in-synchronism conditions defining the hold range of the phase discriminator the control voltage produced is greater than in the out-of-synchronism conditions. However, this is necessary since, once the in-synchronism condition is restored with the aid of the above-described circuit arrangement, the initial frequency deviation still must lie within the hold range of the phase discriminator for the in-synchronism condition.

The only requirement is that at the maximum frequency deviation the output voltage of the system is at least equal to the voltage required to adjust the oscillator at this frequency deviation until the frequency of the output signal of this oscillator is substantially equal to the frequency of the synchronizing signal. As has been discussed hereinbefore, the time constant of the network 4, 5 must be such that not only at the maximum frequency deviation but also at the frequency deviation adjacent the look-in frequency of the phase discriminator a fair beat signal is produced.

The ideal situation is that in which during the first half of a cycle of the beat signal the gate tube 8 is open and during the other half it is closed. If the frequency of the beat signal is reduced, the capacitor 4 can discharge until the diode 3 is again rendered conductive by one of the pulse trains from the sources 1 or 2. Thus, beyond a certain beat frequency the amplitude of the signal shown in FIGS. 3*d* and 4*d* remains the same but its period increases. Hence, the time during which the gate tube 8 is open becomes a progressively small fraction of the period of the beat signal at decreasing frequency derivation. The time during which the mean output voltage of the phase discriminator is zero volts becomes longer and the time during which either the positive-going pulses (FIGS. 4*f* and 4*g*) or the negative-going pulses (FIGS. 3*f* and 3*g*) predominate becomes progressively shorter. Thus, in the out-of-synchronism condition the mean output voltage of the phase discriminator decreases with decrease in the frequency deviation. By the known crawling effect with decreasing frequency deviation this voltage again increases within the lock-in range of the phase discriminator. Hence it must only be ensured, as has already been remarked hereinbefore, that with decreasing frequency deviation the output voltage remains large enough to bring the oscillator into the lock-in range of the phase discriminator.

With increasing frequency deviation, the time during which the capacitor 4 can discharge becomes progressively shorter. As a result, the amplitude of the beat signal becomes progressively smaller. The time $\tau$ during which the gate tube 8 is open thus becomes an ever-increasing fraction of the period of the beat signal. Consequently during the second half of the beat period also pulses are passed which shift on the portion of the sawtooth voltage with a polarity opposite to that during the first half of the beat period. This results in a reduction of the mean output voltage of the phase discriminator in the out-of-synchronism condition. Since with increasing frequency deviation the output voltage must be progressively higher to enable the oscillator to be adjusted, the initial amplitude of the beat signal, that is to say the amplitude at which the capacitor 4 can discharge until a level portion at the base of the sawtooth voltage shown in FIGS. 3*d* and 4*d* appears, must be chosen as large as possible. This allows for some play with respect to the grid current detection of the tube 8 which can be adjusted so that in spite of the decreasing amplitude with increasing beat frequency the tube is nevertheless closed for a considerable part of the beat cycle (slightly less than one-half thereof). Hence, a time constant of 10 msec. for the network 4, 5 provides a reasonably satisfactory compromise.

If, however, the amplitude of the sawtooth beat signal should still be too small at the lowest possible frequency deviation, an improvement can be obtained by means of amplification.

Figure 2:
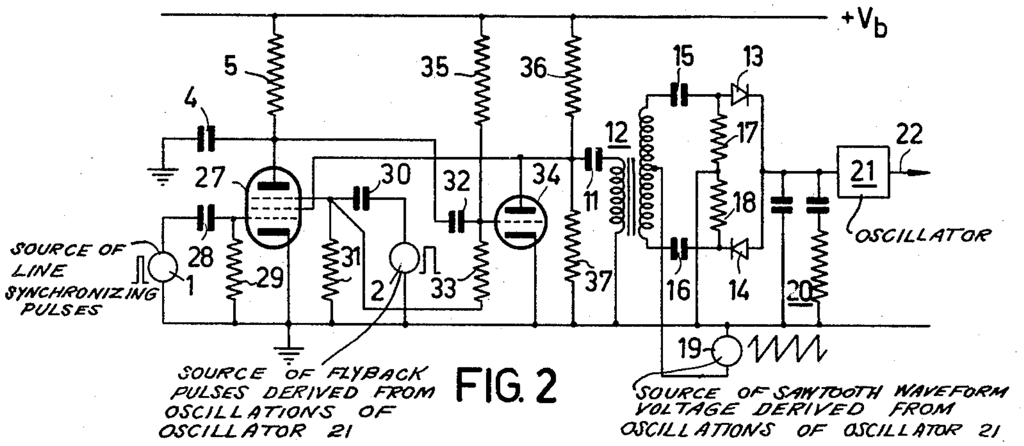
FIG. 2 shows a slightly modified embodiment in which the beat signal is produced in a slightly different way and the gate circuit is controlled in a manner other than that shown in FIG. 1.

The circuit arrangement required for this purpose is shown in FIG. 2. The diode 3 is replaced by a multiple-grid tube 27. The synchronizing pulses are applied to a first control grid of this tube through a grid capacitor 28 and a leak resistor 29 and the fly-back pulses are applied to a second control grid through a grid capacitor 30 and a leak resistor 31. By grid current rectification both the capacitors 28 and 30 are negatively charged and the time constants of the networks 28, 29 and 30, 31 are made large as compared with one period of the synchronising signal. Obviously, these two pulse trains may be interchanged and furthermore the grid current rectification at one or at both control grids may be replaced by bias voltages applied thereto in order to adjust the tube 27 correctly.

In the case of coincidence of the synchronizing and fly-back pulses, the tube 27 passes anode current so that its anode voltage is reduced. As a result, the capacitor 4 is discharged and can again be charged through the resistor 5 until anode current commences again to flow. In addition to the advantage of the amplification the use of the tube 27 provides the advantage that anode current can only flow if in the out-of-synchronism condition synchronizing and fly-back pulses coincide. Hence, at the low beat frequencies the capacitor 4 can be charged for a period longer than that during which it can be discharged when a diode is used. Apart from the amplification, for this reason a larger amplitude can be obtained for the beat signal.

The beat signal taken from the anode of the tube 27 is shifted in phase through 180° relative to that taken from the cathode of the diode 3. Therefore its phase must first be reversed. For this purpose, the signal taken from the anode of the tube 27 is applied to the control grid of a phase-inverter tube 34 through a grid capacitor 32 and a leak resistor 33.

In the out-of-synchronism condition, the tube 34 is cut off during the periods of time $\tau$ and rendered conductive for the rest of the time. Hence, the anode voltage of the tube 34 is high for a time $\tau$. Since the anode of the tube 34 is directly connected to a screen grid of the tube 27, the screen grid voltage thereof is high during a time $\tau$ and consequently the synchronizing pulses are highly amplified and applied through the capacitor 11 to the primary of the transformer 12.

Outside of the periods of time $\tau$ the tube 34 is conductive and hence the screen grid voltage of the tube 27 is low so that the synchronizing pulses are attenuated rather than amplified so that they substantially cannot influence the output voltage of the phase discriminator without the periods of time $\tau$.

It is true that as a result in the out-of-synchronism condition the anode current of the tube 27 will be smaller on coincidence of the synchronizing and fly-back pulses than at a higher screen grid voltage. However, since a very large anode voltage variation is obtained at a low screen grid voltage, this is not of importance.

As will be seen from FIG. 2, the lower end of the leak resistor 33 is not connected to earth but to the second control grid of the tube 27. This is necessary to ensure that in the in-synchronism condition the tube 34 is actually cut off, which otherwise would not be the case.

In an in-synchronism condition, the anode voltage of the tube 27 will be continuously low since the capacitor 4 can scarcely be charged between two pulses. However, the capacitor 32, which was negatively charged in an out-of-synchronism condition by grid current, discharges in the in-synchronism condition. Hence, the bias voltage for the tube 34 would be removed so that this tube would pass current. As a result the screen grid voltage of the tube 27 decreases so that the synchronizing pulses are substantially not amplified, whereas this amplification is necessary in this in-synchronism condition.

By connecting the lower end of the leak resistor 33 to the said second control grid, the tube 34 remains cut off in spite of the capacitor 32 being discharged.

In the in-synchronism condition, the synchronizing and fly-back pulses continuously coincide so that at this second control grid a high negative voltage is set up. In a practical embodiment, this voltage may be about −70 volts and this is amply sufficient to cut off the tube 34.

In the out-of-synchronism condition, however, the synchronizing and fly-back pulses coincide only after a certain number of cycles each time. Since currents can flow to the second control grid only during these coincidences, the mean value to which the capacitor 30 is charged will be much smaller than in an in-synchronism condition. By the provision of a resistor 35 it can be ensured that in out-of-synchronism conditions the control grid of the tube 34, apart from the charge of the capacitor 32, is substantially at earth potential. It should be noted that the time constant of the network 32, 33 is made very large, firstly to hold the charge of the capacitor 32 for a sufficiently long period of time at the lowest possible beat frequencies and secondly to smooth the small fluctuations at the second control grid of the tube 27.

The above-described step also assists in cutting off the tube 34 for about one half of a beat cycle. If the frequency deviation between synchronizing and fly-back pulses is great, a beat signal is produced having a smaller amplitude so that in this event the tube 34 would be likely to be cut off for less than one half of a beat cycle. However, at these high beat frequencies the mean negative voltage at the second control grid exceeds that at low beat frequencies and this higher negative voltage promotes a prolonged cutting-off of the tube 34.

At the very low beat frequencies the beat signal has a larger amplitude. Hence, the tube 34 is likely to be cut off for more than one half of a beat cycle. However, the mean negative voltage set up at the second control grid in this event is lower than at higher beat frequencies, so that prolonged cutting-off is counteracted.

It is remarked that by means of a potentiometer arrangement comprising resistors 36 and 37 the correct screen grid voltage for the tube 27 and the correct anode voltage for the tube 34 can be adjusted to enable the synchronizing pulses to be satisfactorily amplified when the tube 34 is cut off, while these pulses are attenuated rather than amplified when the tube 34 is conductive.

It should further be noted that in effect the tube 27 performs three functions.

Firstly, the sawtooth beat signal is produced in the anode circuit with the aid of the network 4, 5.

Secondly, the part of the tube between control and screen grids acts as a gating tube, gating being effected by the voltage applied by the tube 34.

Thirdly, the part of the tube between the first and second control grids acts as a coincidence detector for the production of a negative voltage which is higher or lower depending upon whether an in-synchronism condition or an out-of-synchronism condition occurs.

Obviously, these three functions, which are either absolutely necessary (the first two functions) or promote satisfactory operation of the circuit arrangement in accordance with the invention (the third function), can also be performed by three separate tubes. If the tube 27 is used in the manner shown in FIG. 2, it is absolutely necessary for the synchronizing pulses to be applied to the first control grid nearest the cathode and for the fly-back pulses to be applied to the second control grid beyond the screen grid.

A further possible way of producing a beat signal is shown in FIG. 5. In this figure, the serially connected sources 1 and 2 are connected to one control grid of a double triode 38 connected as a mono-stable multivibrator, which double triode may obviously be replaced by two single triodes or two multiple grid tubes. As is known, in the stable state the right-hand part of the double triode 38 is conductive. The current flowing through this right-hand part produces a potential difference across a cathode resistor 39 so that the left-hand part of the double triode 38, the control grid of which is connected to earth for direct current through the sources 1 and 2, is cut off.

On coincidence of the synchronizing and fly-back pulses, the left-hand part of the double triode 38 is rendered conductive so that the anode voltage of this part falls off. Through a capacitor 40, this decrease is transmitted to the control grid of the right-hand part which as a result is cut off. The capacitor 40 then discharges across a resistor 41 and the left-hand part of the double triode 38 until the voltage at the right-hand control grid has risen to a value such that the right-hand part again starts to pass current so that the left-hand part is again cut off. This latter stable state is maintained until the next coincidence of synchronizing and fly-back pulses. It should be ensured that the amplitudes both of the synchronizing pulses and of the fly-back pulses are smaller than the potential difference across the resistor 39 so that the left-hand part can only be rendered conductive on coincidence of the two pulses.

Thus, the right-hand part of the double triode 38 is cut off for a time $\tau$ so that its anode voltage has a shape as shown in FIGS. 3*e* and 4*e*. The time $\tau$ is determined by the discharge time of the capacitor 40.

The anode voltage of the right-hand part is supplied to the gate tube 8 through the resistor 6 and the capacitor 7. The output voltage of this tube is not applied to a symmetrical phase detector as in FIGS. 1 and 2, but to an asymmetrical phase detector. Therefore the gate tube 8 must not pass the synchronizing pulses but the sawtooth voltage during the periods of time $\tau$. For this purpose, the source 19 is connected through capacitors 42 and 7 to the control grid of the tube 8. The anode of the tube 8 is coupled through the capacitor 11 to the suppressor grid of a tube 43 connected as an asymmetrical phase detector. The required bias voltage for this suppressor grid is applied through a resistor 44 by a source 45. The synchronizing pulses are applied to the first control grid of the tube 43 through a grid capacitor 46 and a leak resistor 47. The operation of the tube 43 will be explained more fully with reference to FIGS. 6 and 7.

If $f_o > f_s$, FIG. 6 applies which shows the envelope of the anode current and the anode voltage of the tube 43. During the periods of time $\tau$ the anode current of this tube has a shape as shown in FIG. 3*f* and outside these periods the synchronizing pulses only are passed. The bias determined by the source 45 corresponds to the line 25 in FIG. 3*f* so that outside the periods of time $\tau$ the anode current produced by the synchronizing pulses will have the same value as if the synchronizing pulses during these periods of time $\tau$ were situated at the very centres of the steep edges of the sawtooth voltage. With this adjustment the envelope of the anode current $i_a$ of the tube 43 has a shape as shown in FIG. 6*a*. The associated anode voltage $V_a$ is shown in FIG. 6*b*. The anode voltage $V_{a0}$ produced by an anode current $i_{a0}$ is exactly the rest or zero phase voltage for the in-synchronism position, since in this event the synchronizing pulses will always be situated at the centres of the steep edges of the sawtooth voltage. FIG. 6*b* shows that the mean value of the anode voltage exceeds $V_{a0}$ so that this voltage can be used in the out-of-synchronism condition to adjust the oscillator into the lock-in range of the phase discriminator itself.

For $f_o < f_s$, the curves shown in FIGS. 7*a* and 7*b* can be drawn correspondingly with the aid of FIG. 4*f*. FIG. 7*b* shows that in this situation the mean anode voltage is lower than $V_{a0}$ so that the oscillator can be adjusted in the opposite sense.

It should be noted that the discharge time of the capacitor 40 far exceeds the period of the synchronizing pulses. Hence, this capacitor can hardly discharge in an in-synchronism condition. Consequently the right-hand part of the double triode 38 is continuously cut off. The anode voltage of this part therefore remains substantially equal to $V_b$ volts so that the tube 8 remains conductive and the sawtooth voltage from the source 19 is always passed unimpededly.

The circuit arrangement in accordance with the invention is also based on the recognition that it is sufficient after each coincidence of a synchronizing pulse and a fly-back pulse to use the sum voltage produced during this coincidence for the production of a control signal for the gate tube 8 irrespective of the fact whether $f_o > f_s$ or $f_o < f_s$. This conversion is effected by integrating the sum pulse, in FIGS. 1 and 2 by means of the integrating network 4, 5 and in FIG. 5 by integration by means of the capacitor 40, the resistor 41 and the left-hand part of the double triode 38.

That the production of a single control signal is sufficient will be clear from a comparison of FIGS. 3 and 4. In FIGS. 3*f* and 3*g* the synchronizing pulses proceeding in time shift to the right along the sawtooth voltage, whereas in FIGS. 4*f* and 4*g* they shift to the left.

It will further be appreciated that the sawtooth voltage as shown in FIGS. 3*a* and 4*a* may be shifted 180° in phase. In this event, the output voltage of the symmetrical phase detector shown in FIGS. 1 and 2 has opposite polarity. When the phase detector shown in FIG. 5 is used, the mean voltage will be lower than $V_{a0}$ if $f_o > f_s$ and higher than $V_{a0}$ if $f_o < f_s$.

It will also be appreciated that various parts of the circuit arrangements of FIGS. 1, 2 and 5 may be interchanged. Thus, in the circuit arrangement of FIG. 1 instead of the synchronizing signal the sawtooth voltage may be keyed by means of the gate tube 8. Furthermore, the multivibrator circuit of FIG. 5 may be used in the circuit arrangement of FIG. 1 while the beat signal obtained by means of the diode 3 and the network 4, 5 may control the gate tube 8 in FIG. 5.

Furthermore the positive sum voltage of synchronizing and fly-back pulses the use of which has been described hereinbefore, may be replaced by the negative sum voltage. In FIG. 1, for example, the polarity of the pulses delivered by the sources 1 and 2 may be inverted while the connections of the diode 3 may be reversed. From the anode of this reversed diode, a beat signal of opposite polarity is obtained. This signal may have its phase inverted before it is applied to the tube 8. As a further alternative, similarly to FIG. 2, the anode voltage of a tube keyed by the signal taken from the diode may be used to vary the supply voltage of a gate tube so that either the sawtooth voltage shown in FIGS. 3*a* and 4*a* or the synchronizing pulses shown in FIGS. 3*b* and 4*b* applied to this gate tube may be amplified. Alternatively, the said negative sum voltage may be applied to the right-hand control grid of the double triode 38 of FIG. 5 instead of to the control grid of the left-hand part thereof.

Since, for example in FIG. 1, the gate tube 8 may readily be replaced by a transistor, it will be appreciated that a control circuit arrangement in accordance with the invention may also be designed without discharge tubes.

What is claimed is:

1. A circuit for synchronizing an oscillator with a pulsatory synchronizing signal comprising a source of said synchronizing signal, means providing a sawtooth waveform signal and a second pulsatory signal having repetition frequencies the same as the frequency of said oscillator, phase discriminating means connected to said oscillator for controlling the frequency thereof, gate means for applying one of said synchronizing and sawtooth waveform signals to said phase discriminating means, and means providing a control signal for said gate means comprising means producing a beat signal from said synchronizing and second signals, means integrating said beat signal to provide said control signal, and means applying said control signal to said gate means.

2. A circuit for synchronizing an oscillator with a pulsatory synchronizing signal comprising a source of said synchronizing signal, means providing a sawtooth waveform signal and a second pulsatory signal having repetition frequencies the same as the frequency of said oscillator, phase discriminating means connected to said oscillator for controlling the frequency thereof, gate means for applying one of said synchronizing and sawtooth waveform signals to said phase discriminating means, means for applying the other of said synchronizing and sawtooth waveform signals to said phase discriminating means, means for adding said synchronizing and second signals, means for integrating the output of said adding means, and means for applying the integrated output of said adding means to said gate means as a control signal whereby when said oscillator is in synchronism with said synchronizing signal said gate means is continuously open and when said oscillator is out of synchronism with said synchronizing signal said gate means is open only for a fixed time following each simultaneous occurrence of a synchronizing signal and a second signal.

3. A circuit for synchronizing an oscillator with a pulsatory synchronizing signal comprising a source of said synchronizing signal, means providing a sawtooth waveform signal and a second pulsatory signal having repetition frequencies the same as the frequency of said oscillator, phase discriminating means connected to said oscillator for controlling the frequency thereof, gate means for applying said synchronizing signal to said phase discriminating means, means applying said sawtooth waveform signal to said phase discriminating means, means adding said synchronizing and second signals, integrating circuit means, means applying said added signals to said integrating circuit means to produce a control signal, and means for applying said control signal to said gate means whereby when said oscillator is in synchronism with said synchronizing signal said gate means is continuously open and when said oscillator is out of synchronism with said synchronizing signal said gate means is open only for a fixed time following each simultaneous occurrence of a synchronizing signal and a second signal.

4. A circuit for synchronizing an oscillator with a pulsatory synchronizing signal comprising a source of said synchronizing signal, means providing a sawtooth waveform signal and a second pulsatory signal having repetition frequencies the same as the frequency of said oscillator, phase discriminating means connected to said oscillator for controlling the frequency thereof, an electron discharge device having input, common and output electrodes, means connecting said output electrode to said phase discriminating means, means applying said sawtooth waveform signal to said phase discriminating means, means connecting said common electrode to a point of reference potential, first capacitor means applying said synchronizing signal to said input electrode, means adding said synchronizing signal and said second signal for producing a beat signal, integrating circuit means, diode means applying said beat signal to said integrating circuit means, and second capacitor means applying the output of said integrating circuit means to said input electrode.

5. A circuit for synchronizing an oscillator with a pulsatory synchronizing signal comprising a source of said synchronizing signal, means providing a sawtooth waveform signal and a second pulsatory signal having repetition frequencies the same as the frequency of said oscillator, phase discriminating means connected to said oscillator for controlling the frequency thereof, an electron discharge device having cathode, first control electrode, screen electrode, second control electrode, and anode in that order, means applying said synchronizing signal and said second signal to said first and second control electrodes respectively, an integrating circuit connected to said anode, inverting means connecting said anode to said phase discriminating network, means applying said sawtooth waveform signal to said phase discriminating circuit, means biasing said discharge device so that anode current flows only upon coincidence of said synchronizing and second signals, and means for applying the output of said inverting means to said screen electrode.

6. The circuit of claim 5, in which said inverting means comprises a second discharge device having input and output electrodes, first capacitor means for connecting said anode to said input electrode, second capacitor means connecting said output electrode to said phase discriminating network, direct current conductive means connecting said screen electrode to said output electrode, and resistance means connecting said second control electrode to said input electrode for providing cut-off bias for said second discharge device when said oscillator is in synchronism with said synchronizing signal.

7. A circuit for synchronizing an oscillator with a pulsatory synchronizing signal comprising a source of said synchronizing signal, means providing a sawtooth waveform signal and a second pulsatory signal having repetition frequencies the same as the frequency of said oscillator, phase discriminating means connected to said oscillator for controlling the frequency thereof, gate means for applying one of said synchronizing and sawtooth waveform signals to said phase discriminating means, means applying the other of said synchronizing and sawtooth waveform signals to said phase discriminating means, a monostable multivibrator, means adding said synchronizing and second signals, means applying said added signals to said multivibrator whereby upon coincidence of said synchronizing and second signals said multivibrator is triggered to provide an output signal of predetermined duration, and means applying said output signal to said gate means as a control signal, whereby said gate means is open a predetermined time following each coincidence between a synchronizing signal and a second signal.

8. The circuit of claim 7, in which said phase discriminating means comprises an electron discharge device having at least a cathode, a first control electrode, a second control electrode, and an anode, in that order, said gate means being connected to apply said sawtooth waveform signal to said second control electrode, means applying said synchronizing signal to said first control electrode, and means connecting said anode to said oscillator.

References Cited in the file of this patent

UNITED STATES PATENTS 2,968,769 Johnson et al. ............ Jan. 17, 1961